US006218556B1

(12) United States Patent
Pintauro

(10) Patent No.: US 6,218,556 B1
(45) Date of Patent: Apr. 17, 2001

(54) SYNTHESIS OF A LOW TRANS-CONTENT EDIBLE OIL, NON-EDIBLE OIL, OR FATTY ACID IN A SOLID POLYMER ELECTROLYTE REACTOR

(75) Inventor: Peter N. Pintauro, New Orleans, LA (US)

(73) Assignee: The Administrators of the Tulane Educational Fund, New Orleans, LA (US)

( * ) Notice: Subject to any disclaimer, the term of this patent is extended or adjusted under 35 U.S.C. 154(b) by 0 days.

(21) Appl. No.: 08/748,210

(22) Filed: Nov. 12, 1996

(51) Int. Cl.[7] .......... C11B 3/00; C25B 3/00; B01D 17/06

(52) U.S. Cl. .......... 554/124; 554/141; 554/147; 205/413; 205/462; 205/695; 205/696; 204/167

(58) Field of Search .......... 204/167; 205/413, 205/462, 695, 696; 554/141, 147, 124

(56) References Cited

U.S. PATENT DOCUMENTS 5,225,581 * 7/1993 Pintauro .......... 554/147

* cited by examiner

*Primary Examiner*—Edna Wong
(74) *Attorney, Agent, or Firm*—Michael D. Carbo, P.L.C.; Michael D. Carbo; Ronald J. Ventola, II

(57) ABSTRACT

An electrochemical process for hydrogenating an unsaturated fatty acid, mixtures of two or more fatty acids, or the unsaturated fatty acid constituents of an edible or non-edible oil's triglycerides is performed using a solid polymer electrolyte reactor. Membrane electrode assemblies consist of a cation exchange membrane onto which porous anode and cathode electrodes are attached. As the electrodes are permeable, reactant and products enter and leave the membrane/cathode and membrane/anode reaction zones via the back sides of the electrodes. Hydrogen is generated in situ by the electro-reduction of protons that are formed at the anode and which migrate through the ion exchange membrane for reaction with the fifty acids or fatty acid constituents. In the disclosed process, only protons ($H^+$ ions) carry the current between the anode and the cathode. The need for a supporting electrolyte to conduct electricity has been circumvented. The disclosed process operates at a low to moderate temperature at atmospheric or moderate pressure without the use of a supporting electrolyte that will contaminate the oil. A novel partially hydrogenated oil product selected from the group consisting of a partially hydrogenated fatty acid, a partially hydrogenated triglyceride, and mixtures thereof is produced by the disclosed process. The product produced from the disclosed process has: a trans-isomer content lower than that of a similarly hydrogenated oil product formed in a high temperature chemical catalytic reaction process; a peroxide value of less than about 1.5%; free fatty acid content of less than about 0.02%; and, improved purity.

29 Claims, 4 Drawing Sheets

(b) Gas/oil permeable backing, cathode side.
(c) Cathode thin film catalyst layer.
(d) Nafion cation-exchange membrane.
(e) Anode thin film catalyst layer.
(f) Gas/water permeable backing, anode side.

Solid Polymer Electrolyte Electrochemical Cell (a&g) Reactor blocks with cross-patterned flow field.
(b) Gas/oil permeable backing, cathode side.
(c) Cathode thin film catalyst layer.
(d) Nafion cation-exchange membrane.
(e) Anode thin film catalyst layer.
(f) Gas/water permeable backing, anode side.

(b) Gas/oil permeable backing, cathode side.
(c) Cathode thin film catalyst layer.
(d) Nafion cation-exchange membrane.
(e) Anode thin film catalyst layer.
(f) Gas/water permeable backing, anode side.

SYNTHESIS OF A LOW TRANS-CONTENT EDIBLE OIL, NON-EDIBLE OIL, OR FATTY ACID IN A SOLID POLYMER ELECTROLYTE REACTOR

BACKGROUND OF THE INVENTION

The hydrogenation of the unsaturated fatty acid constituents of an edible oil's triglycerides is carried out to produce a more oxidatively stable product and/or change a normally liquid oil into a semi-solid or solid fat with melting characteristics designed for a particular application. Most commercial oil hydrogenation plants use Raney or supported nickel catalyst, where the chemical catalytic reaction is carried out at a high temperature (typically 150–225 C.) and a hydrogen gas pressure in the range of 10–60 psig. These conditions are required to solubilize sufficiently high concentrations of hydrogen gas in the oil/catalyst reaction medium so that the hydrogenation reaction can proceed at acceptably high rates. The hydrogenation rate and fatty acid product distribution has been shown to be dependent mainly on temperature, pressure, agitation rate, and catalyst type and loading. Unfortunately, high reaction temperatures promote a number of deleterious side-reactions including the unfavorable production of trans isomers and the formation of cyclic aromatic fatty acids.

An alternative method to edible and nonedible oil and fatty acid hydrogenation by a traditional chemical catalytic reaction scheme is a low temperature electrocatalytic (electrochemical) route, where an electrically conducting catalyst (e.g., Raney nickel or platinum black) is used as the cathode in an electrochemical reactor. Atomic hydrogen can be generated on the catalyst surface by the electrochemical reduction of protons from the adjacent electrolytic solution. The electro-generated hydrogen then reacts chemically with unsaturated fatty acids in solution or in the oil's triglycerides. The overall oil hydrogenation reaction sequence is as follows:

$$2H^{+}+2e^{-}\rightarrow 2H_{ads} \quad (1)$$

$$2H_{ads}+R{-}CH{=}CH{-}R\rightarrow R{-}CH_2{-}CH_2{-}R \quad (2)$$

where R—CH=CH—R denotes an unsaturated fatty acid. An unwanted side reaction that consumes electro-generated $H_{ads}$ (i.e., current) but does not effect the organic product yield is the formation of $H_2$ gas by the combination of two adsorbed hydrogen atoms, $$2H_{ads}\rightarrow H_2(\text{gas}) \quad (3)$$

All electrochemical reactors must contain two electrodes, a cathode for reduction reactions such as that given by Equation 1 and an anode at which one or more oxidation reactions occur. For a water-based electrolytic solution, the anode reaction is often the oxidation of $H_2O$ to $O_2$ gas, $$H_2O\rightarrow \tfrac{1}{2}O_2+2H^{+}2e^{-} \quad (4)$$

In organic electrochemical syntheses where two or more reactions occur at the same electrode, the effectiveness of the primary electrode reaction is often gauged by the reaction current efficiency. During the electrochemical hydrogenation of edible or non-edible oils, this quantity is a measure of the amount of electro-generated hydrogen which combines with an oil's unsaturated fatty acids (according to Equation 2), as opposed to the amount of atomic hydrogen lost as $H_2$ gas (Equation 3). The current efficiency is computed from the change in total moles of double bonds in the oil or fatty acid (as determined from the gas chromatography fatty acid profiles of initial and final samples of the reaction medium) and the total charge passed in an electrolysis, as noted by the product of the current density (A/cm$^2$), the geometric electrode area (cm$^2$), and the time of current passage (seconds), $$\text{Current Efficiency}(\%)=(\_\text{moles of double bonds})(2\text{ equiv/mole})F/C \quad (5)$$

where F is Faraday's constant (96,487 C/equiv.) and C is the total coulombs passed in electrolysis (the total coulombs is given by the arithmetic product of the current density, geometric electrode area, and time). For the cathodic reaction system where electro-generated H either adds to the oil or two hydrogen atoms combine to form $H_2$, a current efficiency below 100% provides a direct measure of the fraction of current consumed by the $H_2$ gas evolution reaction (cf. Equation 3).

The hydrogenation of the fatty acid constituents of an edible oil's triglycerides is a particularly attractive reaction to examine in an electrocatalytic scheme for the following reasons: (1) low reactor operating temperatures minimize unwanted side reactions and the deleterious thermal degradation of the oil, (2) normally, only 25%–50% of the double bonds in an oil are hydrogenated, thus, eliminating the common problem in electrochemical reactors of low hydrogenation current efficiencies when the unsaturated starting material is nearly depleted, (3) the high molecular weight of the starting oil (892 g/mole for refined soybean oil) means that the electrical energy consumption per pound of hydrogenated product will be low even though the saturation of a double bond requires 2 F/mole of electron charge, and (4) when water is used as the anode reactant and source of H (according to Equation 4), the electrochemical oil hydrogenation method circumvents the need to produce, store, compress, and transport $H_2$ gas.

Since hydrogen is generated in-situ directly on the catalyst surface in an electrocatalytic reaction scheme, high operating temperatures and pressures are not required. By maintaining a low reaction temperature, it may be possible to minimize unwanted isomerization reactions, thermal degradation of the oil, and other deleterious reactions. By passing a high current through the catalyst (i.e., by maintaining a high concentration of atomic hydrogen on the catalyst surface), the hydrogenation rate of the oil may be kept high, even at atmospheric pressure and a low or moderate reaction temperature.

Numerous studies have shown that low hydrogen overpotential electrically conducting catalysts (e.g., Raney nickel, platinum and palladium on carbon powder, and Devarda copper) can be used to electrocatalytically hydrogenate a variety of organic compounds including benzene and multi-ring aromatic compounds, phenol, ketones, nitrocompounds, dinitriles, and glucose [see, for example, T. Chiba, M. Okimoto, H. Nagai, and Y. Takata, *Bulletin of the Chemical Society of Japan,* 56, 719, 1983; L. L. Miller and L. Christensen, *Journal of Organic Chemistry,* 43, 2059, 1978; P. N. Pintauro and J. Bontha, *Journal of Applied Electrochemistry,* 21, 799, 1991; and K Park, P. N. Pintauro, M. M. Baizer, and K. Nobe, *Journal of the Electrochemical Society,* 16, 941, 1986]. These reactions were carried out in both batch and semi-continuous flow reactors containing a liquid-phase electrolytic solution. In most cases the reaction products were similar to those obtained from a traditional chemical catalytic scheme at elevated temperatures and pressures.

Pintauro [U.S. Pat. No. , 5,225,581 Jul. 6, 1993] and Yusem and Pintauro [*Journal of the American Oil Chemists Society,* 69, 399, 1992] showed that soybean oil can be hydrogenated electrocatalytically at a moderate temperature, without an external supply of pressurized $H_2$ gas. Experiments were carried out at 70 C. using an undivided flow-through electrochemical reactor operating in a batch recycle mode. The reaction medium was a two-phase substance of soybean oil in a water/t-butanol solvent containing tetraethylammonium p-toluenesulfonate (hereafter denoted as TEATS) as the supporting electrolyte. In the experiments the reaction was allowed to continue for sufficient time in order to synthesize a commercial-grade "brush" hydrogenation product (25% theoretical conversion of double bonds). Hydrogenation current efficiencies in the range of 50–80% were obtained for apparent current densities of 0.010–0.020 A/cm$^2$ with an oil concentration between 20 and 40 wt/vol % in the water/t-butanol/TEATS electrolyte. The electrohydrogenated oil was characterized by a somewhat higher stearic acid content, as compared to that produced in a traditional hydrogenation process. The total trans isomer content of the electrochemically saturated oil product, typically in the range of 8%–12% was lower than the 20%–30% trans product from a high-temperature chemical catalytic brush hydrogenation process.

In a second paper by Yusem, Pintauro, and co-workers [*Journal of Applied Electrochemistry,* 26, 989, 1996], soybean oil was hydrogenated electrocatalytically on Raney nickel powder catalyst at atmospheric pressure and moderate temperatures in an undivided packed bed radial-flow-through reactor, where Raney nickel catalyst powder was contained in the annular space between two concentric porous ceramic tubes and the flow of the reaction medium (a substance of oil in a water/t-butanol/tetraethylammonium p-toluenesulfonate electrolyte) was either in the inward or outward radial direction. For the brush hydrogenation of soybean oil, current efficiencies of 90–100% were achieved when T=75 C., the apparent current density was 0.010 or 0.015 A/cm$^{2,}$ and the reaction medium consisted of a substance of 10 or 25 wt/vol % soybean oil in water/t-butanol solvent with TEATS salt as the supporting electrolyte.

A serious drawback of the electrochemical oil hydrogenation work of Yusem, Pintauro and co-workers described above was the need to employ a mixed water/t-butanol solvent with a supporting electrolyte salt in order to stabilize the emulsified oil reaction medium and achieve a reasonably high ionic conductivity of the reaction medium. In the absence of a supporting electrolyte, the high resistivity of the reaction medium would cause no current to flow through the oil hydrogenation reactor. Since most salts are sparingly soluble in oils and unsaturated fatty acids, a two-phase reaction medium had to be employed where the salt was dissolved in either water or a mixture of water and t-butanol and the oil was dispersed as small droplets in the aqueous (or water/alcohol) mixture. Additionally, reasonable oil hydrogenation rates (i.e., reasonably high hydrogenation current efficiencies) could only be achieved using a quaternary ammonium salt supporting electrolyte (e.g., tetraethylammonium p-toluenesulfonate). Unfortunately, both the t-butanol co-solvent and the TEATS salt are not food-grade materials. Their use in a commercial edible oil or food-grade fatty acid hydrogenation process would require either proof that these compounds were not hazardous to human health or proof that the compounds can be completely removed from the oil product. Yusem showed, however, that small amounts of TEATS salt were present in the oil after electrohydrogenation and product oil purification [G. Yusem, Ph.D. Dissertation, Tulane University, Dec. 20, 1994], was unable to be achieved). In order to correct the problems associated with this prior work on the electrochemical (electrocatalytic) hydrogenation of oils, a new divided electrochemical reactor configuration has been employed for oil/fatty acid hydrogenation where a polymeric cation-exchange membrane carries out the function of the solvent/supporting electrolyte. This so-called Solid Polymer Electrolyte (SPE) reactor is the subject matter of this patent. The use of such reactors for organic electrochemical oxidation and reduction reactions is not new. To date, however, no one has utilized such a reactor for the electrochemical (electrocatalytic) hydrogenation of edible/non-edible oils and fatty acids.

A solid polymer electrolyte reactor for organic species hydrogenation consists of separate anolyte and catholyte chambers separated by a thin wetted (i.e., hydrated or solvated) cation-exchange membrane. Porous (permeable) electrodes (one anode and one cathode) are attached to each face of the membrane, forming a "Membrane-Electrode-Assembly" (MEA), similar to that employed in solid polymer electrolyte hydrogen/oxygen fuel cells. Water can be circulated past the back-side of the anode, in which case water molecules are oxidized to $O_2$ gas and protons, according to Equation 4. Alternatively, $H_2$ gas can be oxidized to two protons and two electrons at the anode, $$H_2(gas) \rightarrow 2H^+ + 2e^- \quad (6)$$

The electrode reactions take place at electro-catalytic layers at the interfaces between the membrane and the permeable anode and cathode. Protons from $H_2$ or $H_2O$ oxidation at the anode migrate through the ion-exchange membrane under the influence of the applied electric field to the cathode catalyst component of the MEA where the protons are reduced to atomic and molecular hydrogen (Equations 1 and 3). This electro-generated hydrogen can then react with unsaturated fatty acids in an edible oil, for example, where the oil flows past the back-side of the cathode and permeates through the porous cathode structure to the reaction zone at the cathode catalyst/membrane interface. Ion (proton) conductivity occurs through the wetted (hydrated) cation-exchange membrane so that pure oil and distilled water can be circulated in the cathode and anode chambers, respectively. The close proximity of the anode and cathode on a MEA (the electrode separation distance is given by the thickness of the ion-exchange membrane which is typically in the range of 100 m-200 m) and the high ion-exchange capacity of the cation-exchange membrane (i.e., the high concentration of negatively charged moieties immobilized in the polymeric membrane) insures facile $H^+$ transport between the anode and cathode and a small anode-cathode voltage drop during reactor operation at a given current. In such a reactor there is no liquid electrolyte (an aqueous or mixed solvent containing a dissociated supporting electrolyte salt) between the anode and cathode. For the hydrogenation of an edible oil, the use of a solid polymer electrolyte ("SPE") reactor eliminates the presence of supporting electrolyte salts and non-water co-solvents that contaminate the hydro-oil product.

SPE reactors have been examined previously for organic electrochemical syntheses (both oxidation and reduction reactions). The first applications of the SPE process for electro-organic synthesis were published by Ogumi et al. in Japan [A. Ogumi, K. Nishio, and S Yoshizawa, *Electro-*

*chimica Acta,* 26, 1779, 1981] and then by Tallec et al. in France [J. Sarrazin and A. Tallec, *Journal of Electroanalytical Chemistry and Interfacial Electrochemistry,* 137, 183, 1982] and Grinberg et al. in Russia [V. A Grinberg, V. N. Zhuravleva, Y. B. Vasil ev, and V. E. Kazarinov, *Electrokhimiya,* 19,1447, 1983]. There have since been many publications by these and other authors concerning this organic electrochemical technique [see, for example, Z. Ogumi, H. Yamashita, K. Nishio, Z. Takehara, and S. Yoshizawa, *Electrochimica Acta,* 28, 1687, 1983 and Z. Ogumi, M. Inaba, S. Ohashi, M. Uchida, and Z. Takehara, *Electrochimica Acta,* 33, 365,1988 ]. Ogumi and co-workers, for example, examined the electrocatalytic reduction (hydrogenation) of olefinic compounds in a SPE reactor [Z. Ogumi, K Nishio, and S. Yoshizawa, *Electrochimica Acta,* 26, 1779, 1981], where the cathode reactant was either cyclo-octene, -methyl styrene, diethyl maleate, ethyl crotonate, or n-butyl methacrylate dissolved in either ethanol, diethyl ether, or n-hexane. The Membrane-Electrode-Assemblies in this study were composed of Pt, Au, or Au—Pt layers that were deposited onto the surface of a Nafion membrane generically known as a perfluorosulfonic acid cation-exchange membrane) (Nafion is a registered trademark of E. I. DuPont de Nemours Inc.).

Initial soybean oil hydrogenation experiments in a SPE reactor proved unsuccessful due to unacceptably low oil hydrogenation current efficiencies and the degradation of the cathode catalyst component of the MEA during multiple (long-term) experiments [Luke Stevens, M. S. Thesis, Tulane University, Dec. 18, 1995]. The SPE reactor contained membrane-electrode-assemblies purchased from Giner Inc., Waltham, Mass. that were composed of Pt-black (for the cathode) and $RuO_2$ (for the anode) fixed to a Nafion 117 membrane. The cathode was composed of 20 mg/$cm^2$ Pt-black (the thesis incorrectly states that the Pt catalyst loading for the cathode was 4 mg/$cm^2$) with 15 wt % Teflon binder (Teflon is generically known as polytetrafluoroethylene.) Teflon is a registered trademark of E. I. duPont de Nemours Inc. and a platinized tantalum screen current collector. The anode was $RuO_2$ (20 mg/$cm^2$) with 25% Teflon binder (Teflon is generically known as polytetrafluoroethylene.) Teflon is a registered trademark of E. I. duPont de Nemours Inc. and either a platinum screen or platinized titanium screen current collector. The reaction was carried out by circulating either pure oil or oil diluted with heptane past the back-side of the cathode and either a dilute aqueous sulfuric acid or phosphoric acid solution past the back side of the anode. Electro-hydrogenation of the unsaturated fatty acid constituents of the oil was observed in most experiments, with a current efficiency of between about 18% and about 26%, for applied constant current densities between 0.050 and 0.20 A/$cm^2$ and for temperatures between 50C. and 90 C. The low oil hydrogenation current efficiencies declined further to between 8% and 12% after using the MEA in two or more (up to ten) repeated oil hydrogenation experiments. Usually, an electro-organic process with these low product current efficiencies would be useless commercially due to the large losses in electrical energy and the unacceptably large size of the reactor(s) needed to hydrogenate a given amount of reactant. The unacceptably poor current efficiency performance of the reactor has been attributed to: (1) poorly designed MEAs, where the Pt-black cathode was too thick (i.e., the 20 mg/$cm^2$ loading was too high) for oil reactant access to and oil product escape from the catalyst/membrane interface reaction zone and/or (2) the Teflon binder used in the cathode, which did not have the correct hydrophobic/hydrophilic character to allow for oil, water, protons and electro-generated H to meet at the catalyst/membrane interface reaction zone (i.e., if the catalyst binder is too hydrophilic, water will flood the reaction zone and there will be no access of oil to catalyst regions where H generation is occurring; similarly if the catalyst binder is too hydrophobic, oil will flood the catalyst and H generation will occur only on catalyst particles buried within the wetted cation-exchange membrane that are inaccessible to oil reactant). In addition to the low current efficiencies, these preliminary oil hydrogenation experiments suffered from a second drawback, that being the use of non-food-grade sulfuric and phosphoric acid in the water anolyte. Small amounts of these acids will be present with water in the cation-exchange membrane of the MEA and will contact the oil reactant.

SUMMARY OF THE INVENTION

The present invention is directed to an electrochemical process for hydrogenating a single unsaturated fatty acid, mixtures of two or more fatty acids having different degrees of unsaturation, or the unsaturated fatty acids in an edible or non-edible oil's triglycerides. The process is especially useful for edible oils or fats because of the low operating temperature of the reaction and because the oil in the reactor only contacts the reactor housing, a membrane-electrode-assembly (MEA), and water.

The cathode in the reactor is a high surface area, low hydrogen overpotential precious metal catalyst (e.g., platinum or palladium black), an alloy of precious metal catalysts (e.g., Pt—Pd alloy), mixtures of precious metal catalyst powders (e.g., a mixture of Pt-black and Pd-black powders), a catalytic metal or alloy (e.g., Raney nickel, Raney copper, or Raney nickel molybdenum alloy), or a conducting solid containing a precious is metal catalyst (e.g., platinum on carbon powder). If the oxidation reaction in the SPE reactor is water oxidation, $RuO_2$ powder is often used as the anode material, whereas Pt-black powder is often used when the anode reaction is the oxidation of $H_2$ gas (the choice of anode material is dictated by its ability to promote the oxidation reaction of interest and is not limited to $RuO_2$ and Pt). The anode and cathode catalyst materials are used to fabricate Membrane-Electrode-Assemblies (MEAs), not unlike those used in solid polymer electrolyte $H_2/O_2$ fuel cells. A MEA consists of a cation-exchange membrane (such as a DuPont Nafion® 117 membrane) onto which porous anode and cathode electrodes are attached. The electrodes themselves are porous (permeable) to allow reactant and products to enter and leave the membrane/cathode and membrane/anode reaction zones via the back sides of the electrodes. Carbon paper sheets, metal meshes, or expanded metal grids are fixed to the back of each electrode and serve as current collectors. In order to achieve optimal contact between the metal electrode layer and the membrane, the following methods can be used to attach the porous catalytic powders to the opposing surfaces of the membrane: (1) Direct coating of the membrane with the catalytic powders, (2) connection of the electrode materials with the membrane by hot pressing, (3) embedding the electrode materials on the membrane surface in a solution of the membrane material (e.g., a Nafion or Nafion/PTFE solution), or (4) a combination of the aforementioned methods. In the case of edible oil hydrogenation, an MEA can be fabricated by using either Pt-black or Pd-black powder as the cathode material (at a catalyst loading of between 0.5 and 10 mg/$cm^2$) and $RuO_2$ powder as the anode (at a loading of between 0.5–5.0 mg/$cm^2$). The anode and cathode catalyst powders are first mixed well with an isopropyl alcohol solution of dispersed PTFE and Nafion. A sufficient amount of this mixture is then spread uniformly on carbon paper sheets to produce the desired catalyst loading level. The alcohol is allowed to evaporate from the carbon paper, leaving the catalyst and polymer binder on the current collector. The anode and cathode are then hot-pressed onto the faces of a Nafion 117 cation-exchange membrane.

During the electrochemical oil hydrogenation process, hydrogen is generated in-situ by the electro-reduction of protons that are formed at the anode during either water oxidation or $H_2$ oxidation. Protons migrate across the cation-exchange membrane component of the MEA under the influence of the applied electric field and are reduced to H and $H_2$ at the catalytic cathode. The rate of hydrogen formation (i.e., proton reduction) on the cathode catalyst is controlled by the applied current, thus high reaction temperatures and pressure are not needed to generate a catalytically active surface covered with atomic and molecular hydrogen.

The electrochemical hydrogenation reactor can be operated in either a batch, semi-continuous, or continuous mode. The oil or fatty acid reactant in the cathode compartment can be diluted with a suitable non-reacting solvent such as hexane or heptane. The feed solution to the anolyte must be a solvent that produces protons when oxidized electrochemically at the anode. The preferred solvent is water. Alternatively, one could use a dilute acid solution (the acid, such a sulfuric acid, must be chosen properly so that the acid s anion will not be oxidized at the anode) or a nonaqueous or mixed aqueous/nonaqueous solvent that when oxidized produces protons which migrate across the cation-exchange membrane. The reaction can be carried out at or near atmospheric pressure or at an elevated pressure. The reaction temperature is considerably lower than that used in commercial chemical catalytic hydrogenation processes (150 C.–225 C.). For the electrochemical oil/fatty acid hydrogenation process at atmospheric pressure, the preferably reaction temperature is between about 25 C. and 100 C., most preferably between about 40 C. and 80 C. Higher reaction temperatures can be employed (in excess of 100 C.) if the operating pressure in the reactor exceeds one atmosphere in order to prevent boiling of the anode reactant (e.g., water or a dilute acid). By maintaining a reaction temperature lower than that used in chemical catalytic oil hydrogenation process, unwanted thermal degradation and cis/trans isomerization reactions of the oil can be minimized.

The present invention is also directed to a novel partially hydrogenated oil product selected from the group consisting of a partially hydrogenated fatty acid, a partially hydrogenated triglyceride, or mixtures thereof. Here the terminology “partially hydrogenated” refers to any hydro-oil or fatty acid product that contains some fatty acids with unreacted double bonds, even if the number of remaining double bonds is very small but non-zero. The hydrogenated oil product from the SPE reactor is characterized by a trans isomer content that is lower than that of a similarly hydrogenated oil product formed in either a high temperature chemical catalytic reaction process or in a low temperature electrocatalytic hydrogenation scheme with a Raney nickel catalyst cathode, and undivided electrochemical flow cell, and an emulsified oil/water/alcohol/TEATS reaction medium. For example, when soybean oil is electrochemical hydrogenated to an iodine value (IV) of approximately 90 in a SPE reactor operating at 60 C., the trans isomer content of the oil product, as determined by infrared analysis [*Official and Recommended Practices of the American Oil Chemists Society,* 4th edn, edited by D. Firestone, 1989], was essentially identical to that of the starting oil material.

The SPE reactor for oil or fatty acid electro-hydrogenation is clearly distinguishable from the prior electrochemical oil hydrogenation reactor studies of Yusem, Pintauro and co-workers. First, the SPE reactor does not require the presence of a supporting electrolyte salt in the oil reaction medium, thus one can contact the cathode with pure oil is (as opposed to the water/oil/TEATS or water/butanol/oil/TEATS emulsions used previously by Yusem et al.). Secondly, the SPE reactor is a divided flow cell where the anolyte and catholyte reactants and products do not mix (Yusem et al. used only undivided flow cells in their work), thus assuring, for example, that there is no build-up of an explosive mixture of anode-generated $O_2$ and cathode-generated $H_2$ in the reaction medium and no oxidation of the oil by electro-generated oxygen. Thirdly, the anode and cathode electrodes in a SPE reactor are thin, porous beds (typically <0.1 mm in thickness) of catalyst, attached to the opposing faces of a cation-exchange membrane, whereas the cathode in Yusem's and Pintauro's work was either a thick (3 mm) bed of Raney nickel powder catalyst bound in 2.7 wt % Teflon or unbound Raney nickel powder that was pressed against a porous glass filter or contained between two porous ceramic tubes in order to create a packed bed electrode configuration.

The true novelty of the SPE reactor for oil/fatty acid electro-hydrogenation is its operation at a low or moderate temperature and at atmospheric or a low pressure without the use of a supporting electrolyte that will contaminate the oil. Additionally, the close proximity of the anode and cathode (which are separated by a wetted (i.e., hydrated or solvated) cation-exchange membrane with a thickness of no more than 200 m) and the high ion-exchange capacity of the wetted (i.e., hydrated or solvated) membrane insures that the anode-cathode voltage drop during reactor operation will be low, thus lowering the electrical power requirements and reactor operating cost for the hydrogenation process.

BRIEF DESCRIPTION OF THE DRAWINGS

The invention can be more fully understood from the following detailed description when taken in conjunction with the accompanying drawings, in which.

DETAILED DESCRIPTION OF THE PREFERRED EMBODIMENTS

Figure 1:
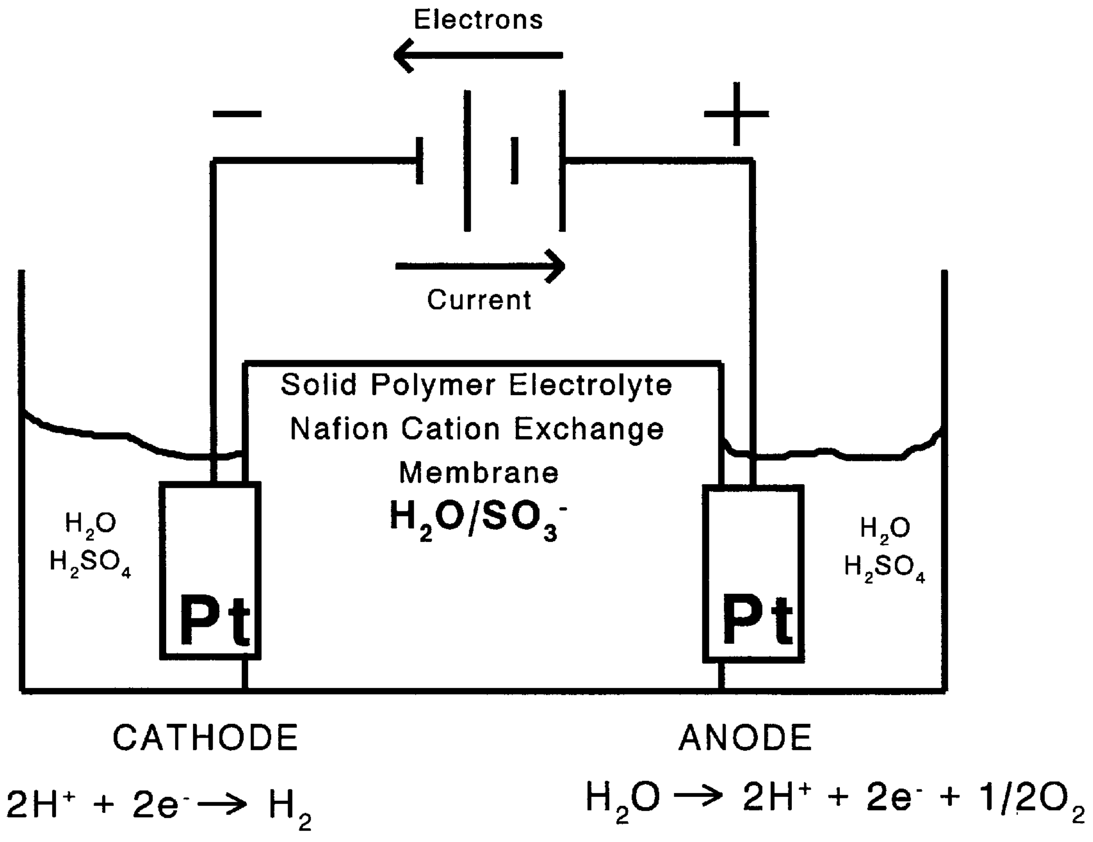
FIG. 1 shows a diagram of an embodiment of a solid polymer electrolyte electrochemical cell according to the invention.
Figure 2:
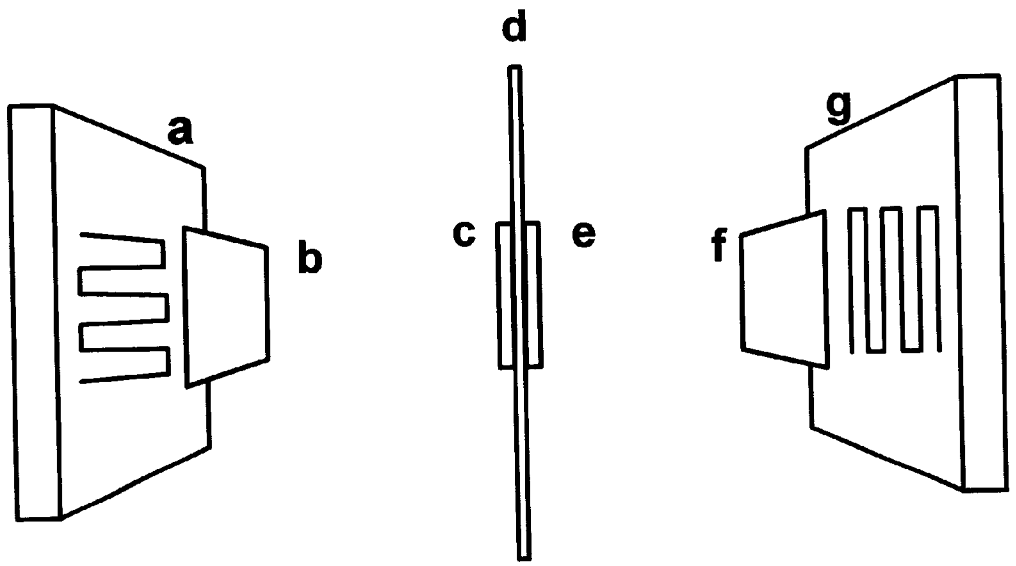
FIG. 2 shows an expanded view schematic diagram of an embodiment of a solid polymer electrolyte reactor according to the invention.
Figure 3:
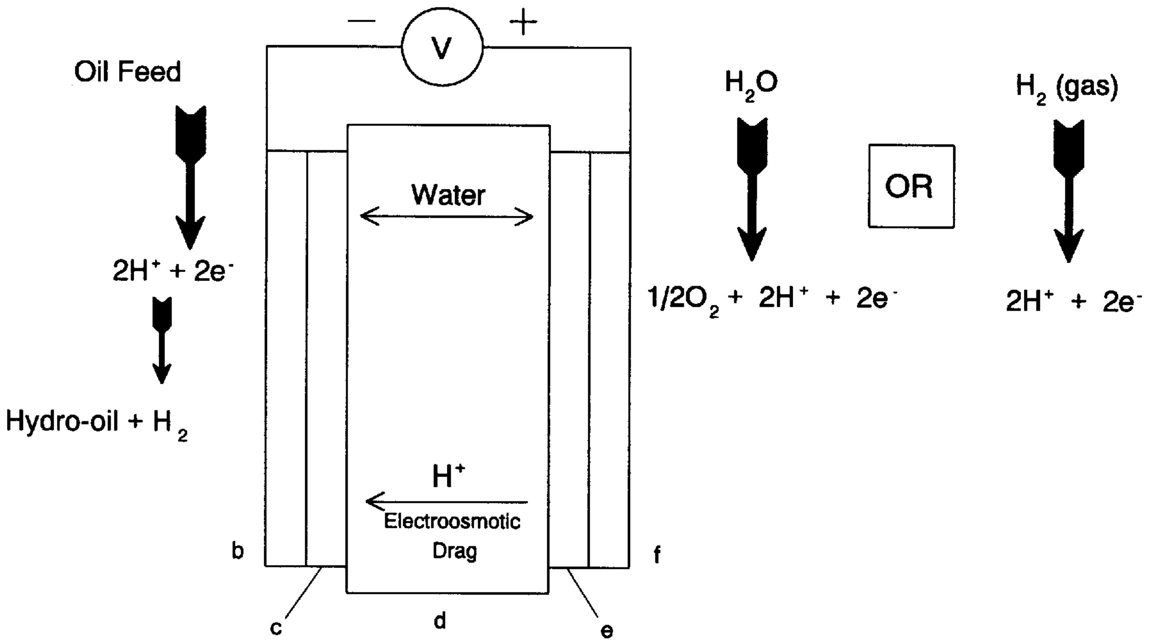
FIG. 3 shows a diagram of the electrochemical catalytic reaction which occurs during use of the process according to the invention; and, FIG. 4 shows a schematic diagram of a solid polymer electrolyte reactor according to the invention.
Figure 4:
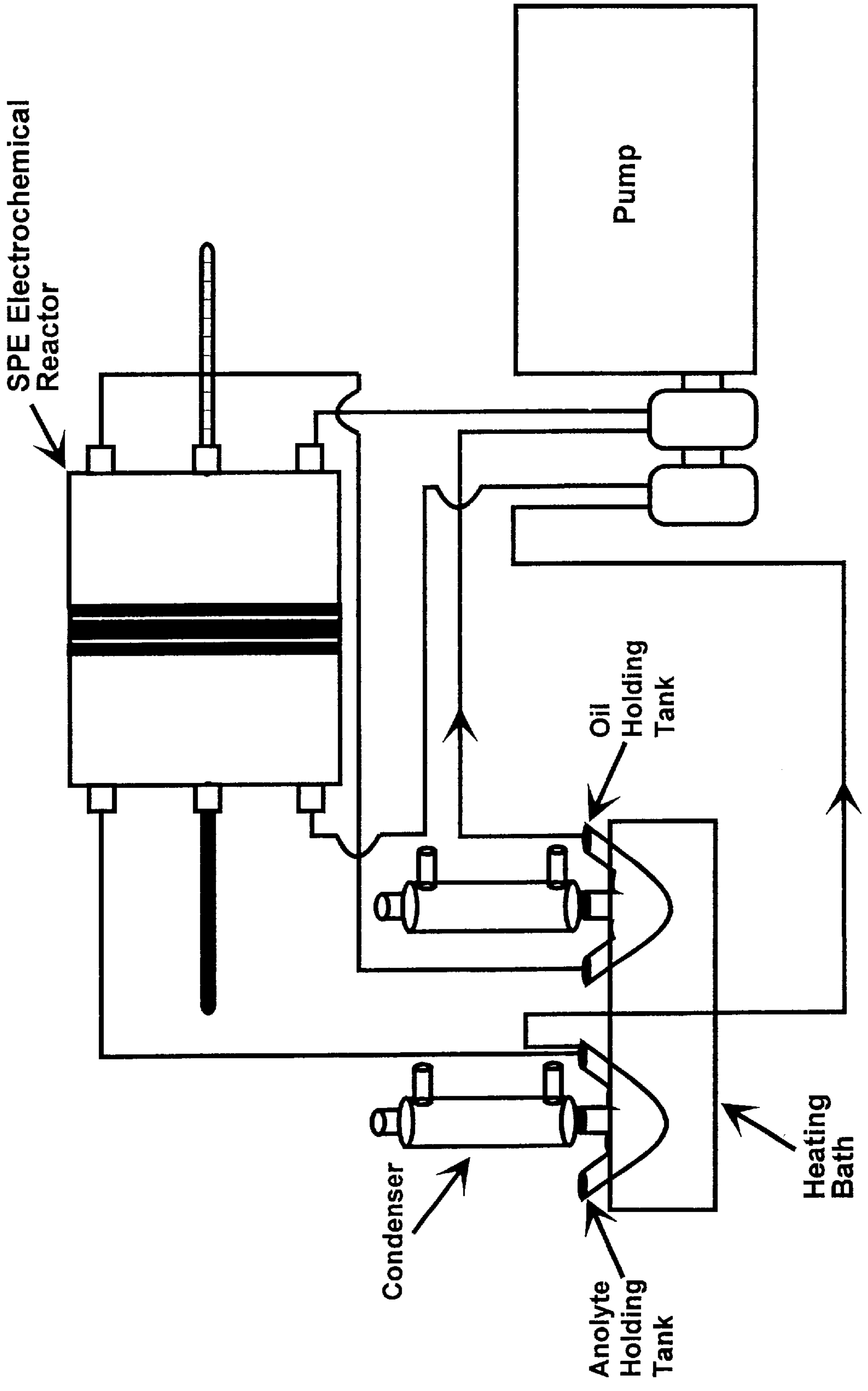

The reaction of interest in this process is the addition of hydrogen to the double bond of fatty acids or the double bond moieties of fatty acids present in an oil's triglycerides. Suitable oils for use herein include edible oils derived from a vegetable, grain, nut, or fish, as well as non-edible oils. Suitable fats include edible fats such as an animal fat, as well as non-edible fats. Typical edible oils include soybean, sunflower, safflower, cottonseed, corn, canola (rape seed), coconut, rice, peanut, palm, and olive oils. The primary fatty acid constituents of these oils which will be hydrogenated are oleic acid, linoleic acid, and linolenic acid. Varying degrees of hydrogenation can be performed in the solid polymer electrolyte reactor by properly controlling the applied current and the contact time of the oil with the catalytic cathode.

In the solid polymer electrolyte reactor, hydrogen ions are generated (along with $O_2$ gas) by the oxidation of water at a $RuO_2$ powder anode. The $H^+$ ions then migrate across a wetted cation-exchange membrane (which separates the anode and cathode) under the influence of the applied electric field. After traversing the membrane, the hydrogen ions contact a catalytic cathode (composed of a precious metal, metal alloy, or metal mixture powder, Raney metal powder, or precious metal on carbon powder) where they are reduced to atomic (H) and molecular ($H_2$) hydrogen. A portion of this hydrogen then reacts with unsaturated fatty acids or unsaturated triglycerides which are circulated past the back side of the cathode. A portion of the electro-generated hydrogen may form $H_2$ gas which can dissolve in the oil or bubble off the cathode, in which case it will be lost for fatty acid/oil hydrogenation.

The key functional component of the solid polymer electrolyte oil/fatty acid electro-hydrogenation reactor is a "Membrane-Electrode-Assembly" which is similar to that used in conventional solid polymer electrolyte $H_2/O_2$ fuel cells and which consists of a catalyst powder/Teflon-Nafion binder or catalyst powder/Teflon binder anode and a catalyst powder/Teflon-Nafion binder cathode that are attached to the opposing surfaces of a cation-exchange membrane. The anode and cathode are porous (permeable) to allow for the transfer of reactant(s) and product(s) to and from the catalyst/membrane interface reaction zone. The membrane material can be any cation-exchanger that will not undergo degradation during the electrochemical reactions (e.g., water oxidation/proton reduction reactions) that occur at the two electrodes during oil hydrogenation. Often, a Nafion cation-exchange membrane, manufactured by E. I. DuPont de Nemours, Inc. is used. The cathode material employed in a SPE oil/fatty acid hydrogenation reactor is comprised of a finely divided metal powder including Raney-type metals (e.g., nickel, cobalt, copper, molybdenum), Raney alloys (e.g., nickel-molybdenum and nickel-cobalt), high surface is area precious (noble) metal powders, precious metal alloy powders, or precious metal powder mixtures (e.g., platinum-black, ruthenium-black, palladium-black, platinum-palladium-black alloys, mixtures of platinum-black and palladium-black powder, as well as platinum-loaded or palladium-loaded carbon powder). The material used as the anode should readily electro-catalyze the oxidation reaction (e.g., the oxidation of water to $O_2$ and protons or the oxidation of $H_2$ gas to $H^+$) without undergoing any form of physical or chemical degradation. $RuO_2$ powder is a suitable material for the anode when the electrode reaction is the oxidation of water.

For the case of Pt-black or Pd-black powder cathodes, catalyst loading is preferably in the range of 0.25–10.0 mg/cm$^2$ of geometric cathode area, most preferably in the range of 1.0–3.0 mg/cm$^2$. For the anode, the preferred $RuO_2$ catalyst loading is between 2.5 and 5.0 mg/cm$^2$.

One method of preparing a Pt-black or Pd-black cathode/$RuO_2$ anode MEA is now described: A commercially available PTFE/isopropyl emulsion (e.g., Teflon-30 emulsion from DuPont) and a Nafion/alcohol emulsion (5 wt % Nafion, 50 wt % isopropyl alcohol, 25 wt % methanol, and 20 wt % water) are added separately to isopropyl alcohol with ultrasonic mixing of the resulting mixture for 10 minutes after each addition. Pt-black or Pd-black catalyst powder is then added to the solution under a $N_2$ atmosphere in order to lo create a solution where the weight percentages of Nafion and PTFE are each 10% of the catalyst dry weight. The mixture is then agitated ultrasonically. The catalyst/polymer solution is then spread on one side of a heated carbon paper sheet (e.g., Toray carbon paper, with a thickness of 0.0067 inches) to a catalyst thickness that is less than or equal to approximately 0.1 mm. Finally, the carbon paper and catalyst layer are heated at 100 C. for 1 hour to evaporate the solvent. The $RuO_2$ powder anode is fabricated in a manner similar to that for the cathode, except that $RuO_2$ powder is used and the weight percentages of Nafion and PTFE polymer binders are 20% and 15% of the anode catalyst dry weight, respectively. The total amount of catalyst on the carbon paper is quantified in terms of catalyst loading (mg of catalyst/cm$^2$ of geometric electrode area). The carbon paper/catalyst anode and cathode are then attached to opposing faces of a Nafion 117 cation-exchange membrane by a hot-pressing technique. The hot-pressing is carried out at a pressure of 160 atm for 90 seconds at a temperature of 250 F.

The preceding fabrication conditions are only intended to illustrate one way of creating an MEA for the oil hydrogenation SPE reactor. Variations in the fabrication conditions from those described above may also produce a useful MEA for oil/fatty acid electro-hydrogenation.

To electrochemically hydrogenate an edible oil or fatty acid, a membrane electrode assembly is placed in an electrochemical reactor containing back-fed anolyte and catholyte chambers. The porous anode and cathode are connected, via the carbon paper current collectors, to the negative and positive leads, respectively, of a power supply. Water or humidified hydrogen gas is pumped past the back side of the anode and oil or fatty acid reactant is pumped past the cathode. Constant (direct) or pulsed currents are supplied to the reactor. The extent of oil/fatty acid hydrogenation is dependent on the applied current, the oil hydrogenation current efficiency, and the contact time of the oil with the catalytic cathode.

EXAMPLES

Example 1

In this example either refined, bleached, and deodorized (RBD) or refined and bleached (RB) soybean oil was electrochemically hydrogenated at a palladium-black or platinum-black cathode in a SPE reactor. The constant applied current density was 0.10 A/cm$^2$, the pressure in the reactor was one atmosphere, and the reaction temperature was 60° C. The SPE reactor was operated in a batch recycle mode with 10 grams of oil feed. The geometric dimensions of the anode and cathode components of the MEA was 2 cm×2 cm. Oil and water were circulated simultaneously through serpentine flow channels along the back-side of the cathode and anode, respectively. The anolyte and catholyte flow rates were each 80 ml/min. The batch recycle loop consisted of the SPE reactor and separate peristaltic pumps and holding tanks (immersed in the same constant temperature bath) for the anolyte and catholyte. The initial and final fatty acid profiles from three oil hydrogenation experiments are listed in Table 1. Reactor operation was essentially indistinguishable for RB and RBD soybean oil feeds The decrease in IV of the oil product and the change in the fatty acid profile, i.e., the increase in wt % of stearic acid (henceforth denoted as C18:0), and the decrease in linoleic acid (C18:1) and linolenic acid (C18:2) are evidence that hydrogenation occurred. The range of product Iodine Values (IVs) in this example (between 61 and 102) shows the versatility of the SPE reactor in synthesizing different hydro-oil products. The low IV example in Table 1 (IV=61) demonstrates that the SPE reactor can be used to synthesize a highly hydrogenated oil product. In principle, there is no limit to the number of double bonds in an oil or fatty acid reactant that can be hydrogenated in the SPE reactor. The extent of hydrogenation is dependent on the charge passed per gram of oil in the reactor and the current efficiency for hydrogenation (where the current efficiency is defined as the percentage of the applied current which produces hydrogen that adds to the double bonds of an oil or fatty acid).

the current efficiency for oil hydrogenation. The decrease in the product oil's IV and the observed shift in the fatty acid profile at the conclusion of the experiment is evidence of hydrogenation. The results show that the soybean oil feed can be hydrogenated to various extents, as evidence of the product IV between 68 and 95 in the SPE reactor.

Changes in the catalyst loading of the $RuO_2$ anode had little effect on the current efficiency for oil hydrogenation. The catalyst loading of the cathode, however, did have a significant effect on the product current efficiency. At both low and high catalyst loadings (e.g., 1 mg/cm$^2$ and 10 mg/cm$^2$) the oil hydrogenation current efficiency was low, whereas, the current efficiency was highest at a Pt loading of 2 mg/cm$^2$. These results are not consistent with prior electrochemical synthesis studies and represent a non-obvious, unanticipated finding. Normally, for an electrocatalytic hydrogenation reaction at a constant current density with simultaneous $H_2$ gas generation, the product current efficiency increases with increasing electrode area because the electro-generated $H_{ads}$ (Equation 1) is more widely distributed over a larger catalyst surface area, thus minimizing the possibility of the $H_{ads}$ recombination reaction (Equation 3). In a SPE reactor, an increase in the catalyst loading of a

TABLE 1

The Electrochemical Hydrogenation of RB and RBD Soybean Oil in a SPE Reactor with a Pd-Black and Pt-Black Cathode
Reactor Temperature: 60 C.
Applied Constant Current Density: 0.10 A/cm$^2$

| Cathode Composition | Anode Composition ($RuO_2$) | Fatty Acid Profile C18:0 | C18:1 | C18:2 | C18:3 | Voltage drop (V) | IV | Charge Passed (C/g) | CE[a] (%) |
|---|---|---|---|---|---|---|---|---|---|
| initial RBD oil | | 4.0 | 24.7 | 53.8 | 6.1 | | 130 | | |
| initial RB oil | | 4.0 | 22.5 | 54.6 | 7.7 | | 134 | | |
| (Pt-black)[b] 2 mg/cm$^2$ | 2.5 mg/cm$^2$ | 19.7 | 24.5 | 39.8 | 4.5 | 1.6~1.7 | 102 | 609 | 40 |
| (Pd-black)[b] 2 mg/cm$^2$ | 2.5 mg/cm$^2$ | 28.1 | 31.7 | 26.2 | 2.7 | 1.6~1.7 | 80 | 629 | 65 |
| (Pd-Black)[c] 2 mg/cm$^2$ | 5 mg/cm$^2$ | 37.4 | 32.3 | 17.9 | 1.0 | 1.6~1.7 | 61 | 987 | 53 |

[a]CE denotes current efficiency for oil hydrogenation
[b]RB soybean oil feed
[c]RBD soybean oil feed Example 2

This example illustrates the performance of the solid polymer electrolyte reactor using a Pt-black cathode and a $RuO_2$ anode with different platinum catalyst loadings. Water was oxidized at the anode and soybean oil (10 grams in each experiment) was electrochemically hydrogenated at the cathode. For all MEAs the cathode catalyst was mixed with 10 wt % Nafion and 10 wt % PTFE, while the anode catalyst was mixed with 20 wt % Nafion and 15 wt % PTFE. The reactor was operated with approximately 10 grams of refined, bleached, and deodorized (RBD) soybean oil, at a temperature of 60 C., 1 atmosphere pressure, an oil flow rate of 80 m/min, and a current density of 0.10 A/cm$^{2.}$ The SPE reactor was operated in a batch recycle mode, as described in Example 1. The data listed in Table 2 show the effects of cathode catalyst loading (between 1 and 10 mg/cm$^2$) and anode catalyst loading (either 2.5 or 5.0 mg/cm$^2$) on the final IV of the oil, the final fatty acid composition of the oil, and MEA corresponds to an increase in the real electrode material surface area. While the trend of increased hydrogenation current efficiency with increase catalyst area (loading) was observed when the cathode catalyst loading was increased from 1 mg/cm$^2$ to 2 mg/cm$^{2,}$ further increases in cathode loading caused the oil hydrogenation current efficiency to fall. As the catalyst powder loading was increased on a MEA, the thickness of the catalytic cathode also increased. For thick cathodes, it appears that oil reactant contact with the catalyst/membrane interface reaction zone and/or hydro-oil escape from this zone was restricted, causing more hydrogen gas evolution from electro-generated $H_{ads}$ and lower current efficiencies. This finding would explain the prior M.S. thesis work of L. Stevens, who used Pt-black cathodes with very high catalyst loadings (20 mg/cm$^2$) and observed very low soybean oil hydrogenation current efficiencies.

TABLE 2

The Electrochemical Hydrogenation of RBD Soybean Oil in a SPE Reactor with a Pt-Black Cathode
T = 60° C., Oil and Water Flow Rate; 80 ml/min each, Current density = 0.10 A/cm$^2$
Charge passed: 987 C/g of oil

| Cathode Composition | Anode Composition | Fatty Acid Profile (wt %) | | | | Voltage drop | | CE[(a)] |
|---|---|---|---|---|---|---|---|---|
| (Pt-Black) | ($RuO_2$) | C18:0 | C18:1 | C18:2 | C18:3 | (v) | IV | (%) |
| Initial Oil | | 4.0 | 24.7 | 53.8 | 6.1 | | 130 | |
| 1 mg/cm$^2$ | 5 mg/cm$^2$ | 23.5 | 27.6 | 34.6 | 3.0 | 1.6~1.8 | 92 | 30 |
| 2 mg/cm$^2$ | 2.5 mg/cm$^2$ | 38.7 | 22.4 | 24.9 | 2.2 | 1.5 | 68 | 48 |
| 2 mg/cm$^2$ | 5 mg/cm$^2$ | 33.9 | 26.2 | 26.1 | 2.2 | 1.6 | 74 | 44 |
| 4 mg/cm$^2$ | 5 mg/cm$^2$ | 29.1 | 26.4 | 30.1 | 2.6 | 1.6 | 82 | 37 |
| 6 mg/cm$^2$ | 5 mg/cm$^2$ | 23.5 | 26.5 | 35.2 | 3.2 | 1.5~1.6 | 92 | 29 |
| 8 mg/cm$^2$ | 5 mg/cm$^2$ | 22.3 | 25.9 | 36.8 | 3.4 | 1.5~1.6 | 95 | 27 |
| 10 mg/cm$^2$ | 5 mg/cm$^2$ | 27.5 | 26.5 | 31.5 | 2.7 | 1.50 | 85 | 35 |

[(a)]CE denotes current efficiency for oil hydrogenation

Example 3

In this example, the oil hydrogenation reaction in the SPE reactor was carried out at a current density of 0.10 A/cm$^{2,}$ atmospheric pressure, and various temperatures ranging from 50 C. to 80 C. The reactor was operated in a batch recycle mode, as described in Example 1, with water oxidation as the anode reaction. The cathode was composed of Pd-black, with a $RuO_2$ anode. RB soybean oil (10 grams) was hydrogenated in each experiment. In Table 3, the initial and final soybean oil fatty acid profiles and the initial and final oil IVs are listed. Product 1VS vary between 80 and 105. The data reveal that the oil hydrogenation can be carried out easily at 50 C., indicating that the SPE oil hydrogenation reactor can, in principle, be operated at temperatures lower than 50 C. Although the maximum reaction temperature in this example is 80 C., the reaction can be carried out at higher temperatures and is only limited by boiling of the water anolyte (a maximum temperature of 100 C. when the reactor is operated at one atmosphere pressure). Reaction temperatures greater than 100 C. are permissible when the anolyte and catholyte are pressurized above one atmosphere.

TABLE 3

The Electrochemical Hydrogenation of RB Soybean Oil in a SPE Reactor at Different Reaction Temperatures
Charge passed in each experiment: 629 C/g of oil

| Temperature | Cathode Composition | Anode Composition | Fatty Acid Profile | | | | Voltage drop | | CE[(a)] |
|---|---|---|---|---|---|---|---|---|---|
| (C.) | (Pd-Black) | (RuO2) | C18:0 | C18:1 | C18:2 | C18:3 | (V) | IV | (%) |
| | Initial Oil | | 4.0 | 22.5 | 54.6 | 7.7 | | 134 | |
| 50 | 2 mg/cm$^2$ | 2.5 mg/cm$^2$ | 9.1 | 41.7 | 34.7 | 3.3 | 1.6~1.7 | 105 | 36 |
| 60 | 2 mg/cm$^2$ | 2.5 mg/cm$^2$ | 25.6 | 30.7 | 29.7 | 2.9 | 1.6~1.7 | 85 | 59 |
| 60 | 2 mg/cm$^2$ | 2.5 mg/cm$^2$ | 28.1 | 31.7 | 26.2 | 2.7 | 1.6~1.7 | 80 | 65 |
| 70 | 2 mg/cm$^2$ | 2.5 mg/cm$^2$ | 25.2 | 30.7 | 30.2 | 2.8 | 1.6~1.7 | 86 | 58 |
| 70 | 2 mg/cm$^2$ | 2.5 mg/cm$^2$ | 20.6 | 35.0 | 30.7 | 2.5 | 1.6~1.7 | 90 | 53 |
| 70 | 2 mg/cm$^2$ | 2.5 mg/cm$^2$ | 20.4 | 33.6 | 31.7 | 3.1 | 1.7~1.8 | 92 | 51 |
| 80 | 2 mg/cm$^2$ | 2.5 mg/cm$^2$ | 16.0 | 36.6 | 33.3 | 2.8 | 1.6~2.1 | 96 | 45 |
| 80 | 2 mg/cm$^2$ | 2.5 mg/cm$^2$ | 24.3 | 31.4 | 30.0 | 3.0 | 1.7~2.2 | 87 | 56 |

[(a)]CE denotes current efficiency for oil hydrogenation

Example 4

In this example, refined, bleached, and dewaxed (RBD) Canola oil was hydrogenated in the solid polymer electrolyte reactor with a Pd-black cathode and a $RuO_2$ anode. The anode reaction was the oxidation of water. The oil and water flow rates were each 80 ml/min, the applied constant current density was 0.10 A/cm$^2$, the reactor pressure was one atmosphere, and the reactor temperature was between 50 C. and 80 C. The reactor was operated in a batch recycle mode, with 10 grams of starting oil for each experiment, as described in Example 1. The final IV of the canola oil product varied from 77 to 107, as shown in Table 4. This example is intended to show that oils other than soybean oil can be electro-hydrogenated in the SPE reactor.

TABLE 4

Electrochemical Hydrogenation of RBD Canola Oil in the Solid Polymer Electrolyte Reactor
Charge passed: 987 C/g of oil

| Temperature | Cathode Composition | Anode Composition | Fatty Acid Profile (wt %) | | | | Voltage drop | | CE[(a)] |
|---|---|---|---|---|---|---|---|---|---|
| (C.) | (Pt-Black) | ($RuO_2$) | C18:0 | C18:1 | C18:2 | C18:3 | (V) | IV | (%) |
| | Initial Oil | | 4.1 | 60.1 | 21.2 | 11.3 | | | |
| 50 | 2 mg/cm$^2$ | 2.5 mg/cm$^2$ | 4.6 | 64.3 | 17.4 | 7.8 | 1.6~1.8 | 106 | 21 |
| 60 | 2 mg/cm$^2$ | 2.5 mg/cm$^2$ | 15.1 | 62.3 | 12.5 | 5.5 | 1.7 | 90 | 48 |
| 70 | 2 mg/cm$^2$ | 2.5 mg/cm$^2$ | 23.4 | 53.1 | 13.8 | 4.1 | 1.6~1.7 | 80 | 64 |
| 80 | 2 mg/cm$^2$ | 2.5 mg/cm$^2$ | 25.4 | 53.1 | 10.9 | 4.9 | 1.6 | 77 | 69 |

[(a)]CE denotes current efficiency for oil hydrogenation

Example 5

This examples illustrates that electrically conducting catalysts other than Pt-black and Pd-black can be used as the cathode in a SPE reactor. For these experiments, the SPE reactor was operated in a batch recycle mode, with water as the anolyte and water oxidation as the anode reaction. The reaction temperature was 60 C., the constant applied current density was 0.10 A/cm$^2$, the anolyte and catholyte flow rates were usually 80 ml/min, and the pressure within the reactor was one atmosphere. For each experiment, 10 grams of RBD soybean oil were hydrogenated. The results of these experiments are listed in Table 6, where the catalytic cathode was either 20% Pt on carbon powder or Raney nickel powder. For the Pt-C experiments, the cathode was fabricated by mixing dry catalyst powder with alcohol emulsion of Nafion (20 wt % Nafion) and PTFE (10 wt % PTFE). In most experiments the anode was $RuO_2$ powder, but one experiment used a Pt-on-carbon powder as the anode material. A drop in the oil product IV and a shift in the fatty acid profile of the oil product to more saturated fatty acids is evidence that the oil was hydrogenated with electrochemically generated hydrogen.

TABLE 5

The Electrochemical Hydrogenation of RBD Soybean Oil Using Catalytic Cathodes Other than Pt-Black and Pd-Black
T = 60° C., Constant applied current density = 0.10 A/cm$^2$, Flow Rate = 80 ml/min
Charge passed: 987 C/g of oil

| Cathode Composition | Anode Composition | Fatty Acid Profile | | | | Voltage drop | |
|---|---|---|---|---|---|---|---|
| (Pt on C) | ($RuO_2$) | C18:0 | C18:1 | C18:2 | C18:3 | (V) | IV |
| Initial Oil | | 4.0 | 24.7 | 53.8 | 6.1 | | 130 |
| (Pt on C) 5 mg/cm$^2$ 20% Nafion 30% PTFE | 5 mg/cm$^2$ 20% Nafion 30% PTFE | 11.7 | 23.7 | 47.8 | 5.5 | 1.6~1.8 | 117 |
| (Pt on C) 5 mg/cm$^2$ 20% Nafion 10% PTFE | 5 mg/cm$^2$ 20% Nafion 30% PTFE | 10.4 | 25.7 | 47.5 | 5.0 | 1.6~1.9 | 117 |
| (Pt on C) 5 mg/cm$^2$ 20% Nafion 10% PTFE | 5 mg/cm$^2$ 20% Nafion 30% PTFE | 10.9 | 25.2 | 45.5 | 5.1 | 1.6~1.7 | 114[(a)] |
| Raney Ni powder | 5 mg/cm$^2$ 20% Nafion 30% PTFE | 4.5 | 25.4 | 52.8 | 5.9 | 2.80~14.7 | 128.6[(b)] |

[(a)]Oil and water flow rates: 20 ml/min
[(b)]Charge passed: 241.2 C/g

Example 6

This example shows that there was no significant increase in total trans isomer content of the hydro-oil products from the solid polymer electrolyte reactor. The cathode material for all experiments was Pt-black, the anode was $RuO_2$ (the anode reaction was water oxidation), the constant applied current density was between 0.050 A/$cm^2$ and 0.200 A/$cm^2$, and the reaction temperature was either 60 C. or 70 C. The SPE reactor was operated in a batch recycle mode (as described in Example 1) with RBD soybean oil (10 grams for each experiment). The total trans isomer content of the oil samples was determined by capillary column gas chromatography. The results in Table 6 show that the trans isomer contents of electro-hydrogenated oil samples from the SPE reactor, with an IV between 77 and 100, are nearly the same as the soybean oil starting material. Most of the trans isomers were found to be present in the C18:1 (linoleic) fatty acids of the soybean oil's triglycerides. A traditional chemical catalytic oil hydrogenation process at high temperature and pressure and a Raney nickel catalyst normally produces 20–30% trans isomers for hydro-oils with an IV between 90 and 105, with even higher trans isomer contents for lower IV oil products.

In Table 6, the value of the percent total trans-isomer content of the Initial Oil is shown as "2.5". It is well known in the art that Initial Oil has a percent total trans-isomer content of "0". The amount "2.5" is attributable to experimental error and should be disregarded.

TABLE 6

Total Trans Isomer Content of RBD Soybean Oil that was Electrochemically Hydrogenated in the SPE Reactor

| Sample No. | Reaction Temperature (C.) | Fatty Acid Profile (wt %) C18:0 | C18:1 | C18:2 | C18:3 | IV | % total trans isomers |
|---|---|---|---|---|---|---|---|
| Initial Oil | | 4.0 | 24.7 | 53.8 | 6.1 | 130 | 2.5 |
| 1 | 60 | 33.9 | 23.1 | 28.9 | 2.7 | 77 | 3.1 |
| 2 | 60 | 18.2 | 26.9 | 39.1 | 3.9 | 100 | 2.6 |
| 3 | 60 | 20.9 | 30.1 | 34.0 | 2.9 | 93 | 3.6 |
| 4 | 70 | 29.0 | 24.7 | 31.3 | 2.7 | 83 | 2.3 |
| 5 | 70 | 20.8 | 28.8 | 34.6 | 2.9 | 92 | 2.8 |
| 6 | 70 | 17.7 | 32.1 | 32.6 | 2.1 | 89 | 2.5 |

Uses for the products made by the processes described herein include edible uses and nonedible uses. Edible uses include frying oil, salad oil, margarine, shortening for baking purposes, and other food ingredients. Nonedible uses include lubricants and as an oil base for cosmetics.

The invention has been described with reference to the preferred embodiments. From this description, a person of ordinary skill in the art may appreciate changes that could be made in the invention which do not depart from the scope and spirit of the invention as described above and claimed hereafter.

What is claimed is:

1. An electrochemical process for hydrogenating an unsaturated fatty acid, a triglyceride or mixtures thereof as an oil and/or a fat, in a solid polymer electrolyte reactor comprising an anolyte chamber, a catholyte chamber, a thin wetted cation-exchange membrane positioned between and separating the anolyte chamber and the catholyte chamber, the membrane having first and second faces, an anode attached to the first face of the membrane, and a high surface area, electrically conducting catalytic cathode attached to the second face of the membrane, the process consisting of the steps of:

(a) introducing into the anolyte chamber an anolyte comprising a chemical compound which produces hydrogen ions when oxidized at the anode;

(b) introducing into the catholyte chamber a substance to be hydrogenated, the substance to be hydrogenated being selected from the group consisting of (i) a single unsaturated fatty acid, (ii) a mixture of two or more fatty acids having different degrees of unsaturation, (iii) an unsaturated fatty acid in an oil's triglycerides, (iv) mixtures thereof as the oil and (v) mixtures thereof as the fat;

(c) contacting the anode with the anolyte and contacting the cathode with the substance to be hydrogenated;

(d) supplying electric energy into the reactor to create hydrogen ions during oxidation of the chemical compound at the anode to cause the hydrogen ions to migrate across the cation-exchange membrane and to cause formation of atomic and molecular hydrogen at the catalytic cathode in an amount sufficient to hydrogenate some or all of the double bonds in the substance; and (e) contacting the surface of the catalytic cathode containing atomic and molecular hydrogen with the substance to be hydrogenated to create a resulting hydrogenated substance.

2. The process according to claim 1, wherein the substance consists of one or more edible oils.

3. The process according to claim 1, wherein the substance consists of one or more nonedible oils.

4. The process according to claim 1, wherein the anolyte consists essentially of water.

5. The process according to claim 1, wherein the catalytic cathode comprises a precious metal catalyst having a catalyst loading of between about 0.5 mg/$cm^2$ and about 10 mg/$cm^2$.

6. The process according to claim 5, wherein the catalytic cathode further comprises a binder.

7. The process according to claim 6, wherein the binder comprises 10% polytetrafluoroethylene and 10% cation-exchange polymer on a dry catalyst weight basis.

8. The process according to claim 6, wherein the catalytic cathode further is comprises carbon paper.

9. The process according to claim 1, wherein the resulting hydrogenated substance has a total trans-isomer content expressed as a percentage, of no more than about 5 percentage points greater than the percent total trans-isomer content of the substances to be hydrogenated.

10. The process according to claim 1, wherein the resulting hydrogenated substance has a total trans-isomer content, expressed as a percentage, of less than 4 percentage points more than the percent total trans-isomer content of the substance to be hydrogenated.

11. The process according to claim 1, wherein the resulting hydrogenated substance has a total trans-isomer content, expressed as a percentage, of no more than about 8 percentage points greater than the percent total trans-isomer content of the substance to be hydrogenated.

12. The process according to claim 1, wherein the resulting hydrogenated substance has an iodine value of between about 130 and about 70 and has a total trans-isomer content, expressed as a percentage, of no more than 1.5 percentage points above the percent total trans-isomer content of the substance to be hydrogenated.

13. The process according to claim 1, wherein the substance to be hydrogenated consists essentially of soybean oil.

14. The process according to claim 1, wherein the substance to be hydrogenated consists essentially of canola oil.

15. The process according to claim 1, wherein the supplied electric energy creates a constant current.

16. The process according to claim 1, wherein the reactor is operated at a pressure equal to one atmosphere.

17. The process according to claim 16, wherein the reactor is operated at a temperature between about 25° C. and about 100° C.

18. The process according to claim 16, wherein the reactor is operated at a temperature between about 50° C. and about 80° C.

19. The process according to claim 1, wherein the reactor is operated at a pressure greater than one atmosphere.

20. The process according to claim 19, wherein the reactor is operated between about 100° C. and about 200° C. and at a pressure sufficiently high to prevent boiling of the anolyte.

21. A product made according to the process of claim 1.

22. A product according to claim 21, wherein the resulting hydrogenated substance is not contaminated with supporting electrolyte salts.

23. A product made according to the process of claim 1, wherein the resulting hydrogenated substance has an iodine value of between 60 and about 100 and does not have a distinctive odor that is common to products made by high temperature, high pressure chemical catalytic hydrogenation processes.

24. An electrochemical process for hydrogenating an unsaturated fatty acid, a triglyceride or mixtures thereof as an oil and/or a fat, in a solid polymer electrolyte reactor comprising an anolyte chamber, a catholyte chamber, a thin wetted cation-exchange membrane positioned between and separating the anolyte chamber and the catholyte chamber, the membrane having first and second faces, an anode attached to the first face of the membrane, and a high surface area, electrically conducting catalytic cathode attached to the second face of the membrane, the process comprising the steps of:

(a) introducing into the anolyte chamber an anolyte consisting essentially of hydrogen gas which produces hydrogen ions when oxidized at the anode;

(b) introducing into the catholyte chamber a substance to be hydrogenated, the substance to be hydrogenated being selected from the group consisting of (i) a single unsaturated fatty acid, (ii) a mixture of two or more fatty acids having different degrees of unsaturation, (iii) an unsaturated fatty acid in an oil's triglycerides, (iv) mixtures thereof as the oil and (v) mixtures thereof as the fat;

(c) contacting the anode with the anolyte and contacting the cathode with the substance to be hydrogenated;

(d) supplying electric energy into the reactor to create hydrogen ions during oxidation of the hydrogen gas at the anode to cause the hydrogen ions to migrate across the cation-exchange membrane and to cause formation of atomic and molecular hydrogen at the catalytic cathode in an amount sufficient to hydrogenate some or all of the double bonds in the substance; and (e) contacting the surface of the catalytic cathode containing atomic and molecular hydrogen with the substance to be hydrogenated to create a resulting hydrogenated substance.

25. An electrochemical process for hydrogenating an unsaturated fatty acid, a triglyceride or mixtures thereof as an oil and/or a fat, in a solid polymer electrolyte reactor comprising an anolyte chamber, a catholyte chamber, a thin wetted cation-exchange membrane positioned between and separating the anolyte chamber and the catholyte chamber, the membrane having first and second faces, an anode attached to the first face of the membrane, and a high surface area, electrically conducting catalytic cathode attached to the second face of the membrane, the process comprising the steps of:

(a) introducing into the anolyte chamber an anolyte consisting essentially of a chemical compound which produces hydrogen ions when oxidized at the anode;

(b) introducing into the catholyte chamber a substance to be hydrogenated, the substance to be hydrogenated being selected from the group consisting of (i) a single unsaturated fatty acid, (ii) a mixture of two or more fatty acids having different degrees of unsaturation, (iii) an unsaturated fatty acid in an oil's triglycerides, (iv) mixtures thereof as the oil and (v) mixtures thereof as the fat;

(c) contacting the anode with the anolyte and contacting the cathode with the substance to be hydrogenated;

(d) supplying electric energy into the reactor to create hydrogen ions during oxidation of the chemical compound at the anode to cause the hydrogen ions to migrate across the cation-exchange membrane and to cause formation of atomic and molecular hydrogen at the catalytic cathode in an amount sufficient to hydrogenate some or all of the double bonds in the substance wherein the supplied electric energy creates a pulsed current; and (e) contacting the surface of the catalytic cathode containing atomic and molecular hydrogen with the substance to be hydrogenated to create a resulting hydrogenated substance.

26. An electrochemical process for hydrogenating an unsaturated fatty acid, a triglyceride or mixtures thereof as an oil and/or a fat, in a solid polymer electrolyte reactor comprising an anolyte chamber, a catholyte chamber, a thin wetted cation-exchange membrane positioned between and separating the anolyte chamber and the catholyte chamber, the membrane having first and second faces, an anode attached to the first face of the membrane, and a high surface area electrically conducting catalytic cathode attached to the second face of the membrane, and the solid polymer electrolyte reactor having no supporting electrolyte salt between the anode and the cathode, the process consisting of the steps of:

(a) introducing into the anolyte chamber an anolyte consisting essentially of a chemical compound which produces hydrogen ions when oxidized at the anode;

(b) introducing into the catholyte chamber a substance to be hydrogenated, the substance to be hydrogenated being selected from the group consisting of (i) a single unsaturated fatty acid, (ii) a mixture of two or more fatty acids having different degrees of unsaturation, (iii) an unsaturated fatty acid in an oil's triglycerides, and (iv) mixtures thereof as the oil and (v) mixtures thereof as the fat;

(c) contacting the anode with the anolyte and contacting the cathode with the substance to be hydrogenated;

(d) supplying electric energy into the reactor to create hydrogen ions during oxidation of the chemical compound at the anode to cause the hydrogen ions to migrate across the cation-exchange membrane and to cause formation of atomic and molecular hydrogen at the catalytic cathode in an amount sufficient to hydrogenate some or all of the double bonds in the substance; and (e) contacting the surface of the catalytic cathode containing atomic and molecular hydrogen with the substance to be hydrogenated to create a resulting hydrogenated substance.

27. A product made according to the process of claim 26.

28. The product according to the process of claim 27, wherein the resulting hydrogenated substance has an iodine value of between about 60 and about 100 and does not have a distinctive odor that is common to products made by high temperature, high pressure chemical catalytic hydrogenation processes.

29. The product according to claim 27, wherein the resulting hydrogenated substance is not contaminated with supporting electrolyte salts.

* * * * *